United States Patent
Okada et al.

(10) Patent No.: US 6,764,985 B2
(45) Date of Patent: Jul. 20, 2004

(54) VISCOSITY MODIFIER FOR LUBRICATING OIL AND LUBRICATING OIL COMPOSITION

(75) Inventors: Keiji Okada, Sodegaura (JP); Ryousuke Kaneshige, Ichihara (JP)

(73) Assignees: Mitsui Chemicals, Inc., Tokyo (JP); The Lubrizol Corporation, Wickliffe, OH (US)

(*) Notice: Subject to any disclaimer, the term of this patent is extended or adjusted under 35 U.S.C. 154(b) by 0 days.

(21) Appl. No.: 10/030,382

(22) PCT Filed: May 10, 2001

(86) PCT No.: PCT/JP01/03894
§ 371 (c)(1),
(2), (4) Date: Jan. 10, 2002

(87) PCT Pub. No.: WO01/85880
PCT Pub. Date: Nov. 15, 2001

(65) Prior Publication Data
US 2003/0087772 A1 May 8, 2003

(51) Int. Cl.$^7$ .................. C10M 143/08; C08F 210/16
(52) U.S. Cl. .................. 508/591; 585/12; 585/18; 525/331.7
(58) Field of Search .......................... 508/591

(56) References Cited

U.S. PATENT DOCUMENTS

| | | | |
|---|---|---|---|
| 3,551,336 A | | 12/1970 | Jacobsson et al. ............ 585/12 |
| 3,691,078 A | | 9/1972 | Johnston et al. ............. 585/11 |
| 3,697,429 A | | 10/1972 | Engel et al. ................. 585/12 |
| 4,507,515 A | | 3/1985 | Johnston et al. ............. 585/12 |
| 4,666,619 A | * | 5/1987 | Kresge et al. ............... 508/591 |
| 5,151,204 A | * | 9/1992 | Struglinski ................... 508/591 |
| 5,446,221 A | * | 8/1995 | Struglinski ................... 585/10 |
| 5,811,379 A | * | 9/1998 | Rossi et al. .................. 508/591 |
| 6,525,007 B2 | * | 2/2003 | Okada et al. ................. 508/591 |

FOREIGN PATENT DOCUMENTS

| | | |
|---|---|---|
| EP | 129414 A1 | 12/1984 |
| EP | 1148115 A1 | 10/2001 |
| EP | 1178102 A1 | 2/2002 |
| JP | 60228600 A | 11/1985 |
| JP | 8-301934 A | 11/1996 |
| JP | 8301934 A | 11/1996 |
| JP | 2000-191855 A | 7/2000 |
| JP | 2000-191857 A | 7/2000 |
| JP | 2000-198892 A | 7/2000 |
| WO | WO9738019 A1 | 10/1997 |

OTHER PUBLICATIONS

Randall, *JMS–Rev. Macromol. Chem. Phys.*, C29(2&3), pp. 201–317 (1989).
*Macromolecule Analysis Handbook*, (Society of Japan Analytical Chemistry, edited by Kinokuniya Shoten) (with partial translation of p. 973, "Monomer Ratio".

* cited by examiner

*Primary Examiner*—Ellen M McAvoy
(74) *Attorney, Agent, or Firm*—Birch, Stewart, Kolasch & Birch, LLP

(57) ABSTRACT

This invention aims to provide lubricating oil compositions excellent in low-temperature properties, oxidation stability, lubricity at high temperatures and fuel efficiency and also in handling properties at low temperatures, and a viscosity modifier for lubricating oil employable in said lubricating oil compositions.

The viscosity modifier for lubricating oil comprises an ethylene/α-olefin copolymer (B) composed of:
(i) ethylene,
(ii) an α-olefin of 3 or more carbon atoms, and
(iii) a higher α-olefin of 4 to 20 carbon atoms wherein the carbon number of (iii) is larger than that of (ii) by one or more, and the ethylene/α-olefin copolymer (B) has the following properties (b-1) and (b-2):
(b-1) a content of ethylene (i) is in the range of 40 to 80% by weight, a content of the α-olefin of 3 or more carbon atoms (ii) is in the range of 15 to 59% by weight, and a content of the higher α-olefin of 4 to 20 carbon atoms (iii) is in the range of 0.1 to 25% by weight with the proviso that the sum is 100% by weight; and
(b-2) a weight-average molecular weight (Mw) in terms of polystyrene as measured by GPC is between 80,000 and 400,000.

13 Claims, No Drawings

VISCOSITY MODIFIER FOR LUBRICATING OIL AND LUBRICATING OIL COMPOSITION

This application is the national phase under 35 U.S.C. § 371 of PCT International Application No. PCT/JP01/03894 which has an International filing date of May 10, 2001, which designated the United States of America.

FIELD OF THE INVENTION

The present invention relates to a viscosity modifier for lubricating oil and lubricating oil compositions. More particularly, the invention relates to a viscosity modifier for lubricating oil with which a lubricating oil composition excellent in low-temperature properties and handling properties at low temperatures is obtained, and lubricating oil compositions containing said viscosity modifier.

BACKGROUND OF THE INVENTION

The viscosity of petroleum products varies eminently with temperature. The viscosity of lubricating oil for automobiles, however, is desired to have small dependency on temperature. In order to control the temperature dependency of the lubricating oils, an ethylene/α-olefin copolymer which has a viscosity index improvement effect, has been widely employed as a compounding agent.

The lubricating oils lose flowability at a low temperature because of crystal-solidification of its wax component. For the purpose of lowering a solidification temperature, the lubricating oils contain a pour-point depressant. The pour-point depressant blocks formation of three-dimensional network owing to the crystallization of wax component in the lubricating oil, and lead a pour point of the lubricating oil to lower.

Among the properties of the lubricating oils containing an ethylene/α-olefin copolymer and a pour-point depressant at low-temperature, a viscosity under a high shear rate is determined by compatibility between a lubricating oil base and the ethylene/α-olefin copolymer, and a viscosity under a low shear rate is remarkably influenced by the pour-point depressant. It is known that in case using a specifically composed ethylene/α-olefin copolymer, the effect of the pour-point depressant is greatly deteriorated by the interaction between the pour-point depressant and the copolymer (see U.S. Pat. No. 3,697,429 and U.S. Pat. No. 3,551,336).

Accordingly, the ethylene/α-olefin copolymer blended in lubricating oils is expected, particularly in the case where excellent low-temperature properties are conditioned, not to hinder the function of the pour-point depressant as well as to be satisfactory in the viscosity index improvement effect.

In order to prevent the interaction between the pour-point depressant and the ethylene/α-olefin copolymer, a proposal has been made where an ethylene/α-olefin copolymer having ununiform composition distribution and obtained by the use of a specific polymerization apparatus under specific polymerization conditions, is used as a viscosity index improver (JP A 60(1985)-228600). However, the lubricating oil having excellent low-temperature properties at any shear rate has not been produced.

As the method of the improvement of low-temperature properties of lubricating oils, it can be considered that an ethylene/propylene copolymer with a high ethylene content is added to the oils as a viscosity index improver. Although the high ethylene content leads to improvement of the low-temperature properties, it invites crystallization of ethylene sequences in the viscosity index improver at a low temperature to render a lubricating oil composition jellylike state, and results in the handling properties being occasionally deteriorated.

When the use of a copolymer with a high ethylene content as a viscosity modifier for lubricating oil is appropriate, even slight broadening in the composition distribution of the ethylene copolymer could cause gelling at a low temperature. Thus, property tolerance of the employed copolymer can not be so wide, and the properties need to be strictly controlled.

In view of such circumstances, the inventors of the present invention have worked earnestly to find out that by the use of a specific copolymer of ethylene, an α-olefin of 3 or more carbon atoms and an α-olefin of 4 or more carbon atoms, the interaction deteriorating the effect of the pour-point depressant is not caused and the compatibility between the copolymer and the lubricating oil base at a low temperature may be controlled, whereby a lubricating oil composition excellent in low-temperature properties at any shear rate and in handling properties at low temperatures is obtained. With the finding, the inventors completed the invention.

This invention aims to provide lubricating oil compositions excellent in low-temperature properties, oxidation stability, lubricity at high temperatures and fuel efficiency and also in handling properties at low temperatures, and a viscosity modifier for lubricating oil employed in said lubricating oil compositions.

DISCLOSURE OF THE INVENTION

A viscosity modifier for lubricating oil of the invention comprises an ethylene/α-olefin copolymer (B) containing:
(i) ethylene,
(ii) an α-olefin of 3 or more carbon atoms, and
(iii) a higher α-olefin of 4 to 20 carbon atoms wherein the carbon number of (iii) is larger than that of (ii) by one or more, and
the ethylene/α-olefin copolymer (B) has the following properties (1) and (2):
(1) a content of ethylene (i) is in the range of 40 to 80% by weight, a content of the α-olefin of 3 or more carbon atoms (ii) is in the range of 15 to 59% by weight, and a content of the higher α-olefin of 4 to 20 carbon atoms (iii) is in the range of 0.1 to 25% by weight with the proviso that the sum is 100% by weight; and
(2) a weight-average molecular weight (Mw) in terms of polystyrene as measured by GPC is between 80,000 and 400,000.

The ethylene/α-olefin copolymer (B) preferably has a ratio of Mw/Mn being 2.4 or less (3).

The ethylene/α-olefin copolymer (B) preferably has a melting point (Tm) being 60° C. or lower as measured by DSC (4).

It is preferable that the α-olefin of 3 or more carbon atoms (ii) which is a constituent of the ethylene/α-olefin copolymer (B), be propylene. Preferably, the higher α-olefin (iii) which is another constituent of the ethylene/α-olefin copolymer (B), has 6 to 20 carbon atoms.

It is preferable in the ethylene/α-olefin copolymer (B) that ethylene (i) be contained in an amount of 60 to 80% by weight, likewise, the α-olefin of 3 or more carbon atoms (ii) in an amount of 18 to 34% by weight, and the higher α-olefin of 4 to 20 carbon atoms (iii) in an amount of 0.5 to 20% by weight.

One embodiment of the lubricating oil compositions of the invention comprises (A) a lubricating oil base and (B) the ethylene/α-olefin copolymer in an amount of 1 to 30% by weight.

The other embodiment of the lubricating oil compositions of the invention comprises (A) a lubricating oil base, (B) the ethylene/α-olefin copolymer in an amount of 0.1 to 5% by weight, and (C) a pour-point depressant in an amount of 0.05 to 5% by weight.

BEST MODE TO CARRY OUT THE INVENTION

The following are detailed descriptions on the viscosity modifier for lubricating oil and the lubricating oil compositions of the invention. In this specification, all the numbers for material amount, reaction conditions, molecular weight, carbon atoms, etc. should be read with the term "about" within the limit ensuring the good technical understanding except in the examples or unless otherwise mentioned.

Viscosity modifier for Lubricating Oil

The viscosity modifier for lubricating oil of the invention comprises a copolymer (B), which will be detailed later, containing ethylene (i), an α-olefin of 3 or more carbon atoms (ii), and a higher α-olefin of 4 to 20 carbon atoms (iii) in which the carbon number always exceeds that of said α-olefin of 3 or more carbon atoms by a majority of 1 or more (said copolymer (B) will sometimes be referred to as an ethylene/α-olefin copolymer (B) hereinafter).

Examples of the α-olefin of 3 or more carbon atoms (ii) are propylene, 1-butene, 1-pentene, 1-hexene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 1-octene, 1-decene, 1-dodecene, 1-tetradecene, 1-hexadecene and 1-octadecene. Those having 3 to 19 carbon atoms are preferable among these. Particularly, propylene is preferable.

Examples of higher α-olefins of 4 to 20 carbon atoms are 1-butene, 1-pentene, 1-hexene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 1-octene, 1-decene, 1-dodecene, 1-tetradecene, 1-hexadecene, 1-octadecene and 1-eicosene. Among these, those having 6 to 20 carbon atoms, preferably 8 to 20 carbon atoms, more preferably 12 to 20 carbon atoms, even more preferably 14 to 20 carbon atoms are used in the invention. Lubricating oils comprising a higher α-olefin having carbon atoms in the above range, show particularly excellent low-temperature properties in a broad range of ethylene content.

Another monomer may be copolymerized within the limit not missing the object of the invention, but preferably polyene compounds are not contained as a copolymer constituent. In this case, a copolymer is excellent in heat resistance and free from oxidation and coloration, and lubricating oil comprising said copolymer is particularly satisfactory in lubricity.

The ethylene/α-olefin copolymer (B) has the content of (i) ethylene (E: content of recurring units derived from ethylene) in a range of 40 to 80% by weight, the content of (ii) the α-olefin of 3 or more carbon atoms (content of recurring units derived from the α-olefin of 3 or more carbon atoms) in a range of 15 to 59% by weight, and the content of (iii) the higher α-olefin (sometimes referred to as HAO hereinafter) of 4 to 20 carbon atoms (content of recurring units derived from HAO) in a range of 0.1 to 25% by weight, with the proviso that the sum of the recurring units is 100% by weight.

Ethylene Content (i)

The ethylene (i) content is in the range of 40 to 80% by weight, preferably 60 to 80% by weight.

Specifically, the ethylene (i) content is preferably in the range of 65 to 80% by weight, further preferably 68 to 77% by weight, highly preferably 68 to 75% by weight. The ethylene (i) content preferably falls in the above ranges when the carbon number of the HAO (iii) is 4 to 11.

When the carbon number of the HAO (iii) is between 12 and 20, the ethylene (i) content is desirably in the range of 65 to 80% by weight, preferably 60 to 75% by weight, more preferably 60 to 70% by weight.

It is also desirable for the ethylene content to fall in the range of 40 to 60% by weight, preferably 40 to 59% by weight. In this case, the ethylene (i) content is preferably in the range of 40 to 55% by weight, further preferably 43 to 53% by weight. The ethylene (i) content preferably falls in the above ranges when the carbon number of the HAO (iii) is 4 to 11.

When the carbon number of the HAO (iii) is 12 to 20, the ethylene (i) content is preferably in the range of 40 to 55% by weight, more preferably 40 to 50% by weight.

Content of the α-Olefin of 3 or More Carbon Atoms (ii)

The content of the α-olefin of 3 or more carbon atoms (ii) is in the range of 15 to 59% by weight, preferably 15 to 39% by weight.

Specifically, it is preferably in the range of 18 to 34% by weight, further preferably 20 to 31% by weight. It preferably falls in the above ranges when the carbon number of the HAO (iii) is 4 to 11.

It is also desirable for the content of the α-olefin of 3 or more carbon atoms (ii) to fall in the range of 15 to 31% by weight, preferably 18 to 28% by weight. It preferably falls in the above ranges when the carbon number of the HAO (iii) is 12 to 20.

It is still desirable for the content of the α-olefin of 3 or more carbon atoms (ii) to fall in the range of 39 to 59% by weight, preferably 40 to 59% by weight. It preferably falls in the range of 44 to 59% by weight, more preferably 40 to 50% by weight when the carbon number of the HAO (iii) is 4 to 11.

The content of the α-olefin of 3 or more carbon atoms (ii) preferably falls in the range of 40 to 53% by weight, more preferably 40 to 50% by weight when the carbon number of the HAO (iii) is 12 to 20.

HAO (iii) Content

The HAO (iii) content is in the range of 0.1 to 25% by weight, preferably 0.5 to 20% by weight. When the carbon number of the HAO (iii) is 4 to 11, the HAO (iii) content preferably falls in the range of 0.5 to 15% by weight, more preferably 0.5 to 10% by weight, highly preferably 0.5 to 7% by weight. When the carbon number of the HAO (iii) is 12 to 20, the HAO content is preferably between 7 and 20% by weight, more preferably between 10 and 20% by weight.

It is a preferable embodiment (B-1) that the ethylene/α-olefin copolymer (B) comprises (i) ethylene in an amount of 60 to 80% by weight, (ii) an α-olefin of 3 or more carbon atoms in an amount of 15 to 39% by weight, and (iii) HAO in an amount of 0.5 to 20% by weight. More preferably, it comprises (i) ethylene in an amount of 65 to 80% by weight, (ii) an α-olefin of 3 or more carbon atoms in an amount of 18 to 34% by weight, and (iii) HAO in an amount of 0.5 to 7% by weight. Even more preferably, it comprises (i) ethylene in an amount of 68 to 77% by weight, (ii) an α-olefin of 3 or more carbon atoms in an amount of 20 to 31% by weight, and (iii) HAO in an amount of 0.5 to 7% by weight. The ethylene/α-olefin copolymer (B-1) having these compositions is preferred when the carbon number of HAO (iii) is 4 to 12.

It is another preferable embodiment (B-2) that the ethylene/α-olefin copolymer (B) comprises (i) ethylene in an amount of 60 to 75% by weight, (ii) an α-olefin of 3 or more carbon atoms in an amount of 15 to 31% by weight, and (iii) HAO in an amount of 7 to 20% by weight. More preferably, it comprises (i) ethylene in an amount of 60 to 70% by weight, (ii) an α-olefin of 3 or more carbon atoms in an amount of 18 to 28% by weight, and (iii) HAO in an amount of 10 to 20% by weight. The ethylene/α-olefin copolymer (B-2) having these compositions is preferred when the carbon number of HAO (iii) is 12 to 20.

It is another preferable embodiment (B-3) that the ethylene/α-olefin copolymer (B) comprises (i) ethylene in an amount of 40 to 59% by weight, (ii) an α-olefin of 3 or more carbon atoms in an amount of 39 to 59% by weight, and (iii) HAO in an amount of 0.5 to 20% by weight. More preferably, it comprises (i) ethylene in an amount of 40 to 55% by weight, (ii) an α-olefin of 3 or more carbon atoms in an amount of 44 to 59% by weight, and (iii) HAO in an amount of 0.5 to 15% by weight. Even more preferably, it comprises (i) ethylene in an amount of 43 to 53% by weight, (ii) an α-olefin of 3 or more carbon atoms in an amount of 46 to 56% by weight, and (iii) HAO in an amount of 0.5 to 7% by weight. The ethylene/α-olefin copolymer (B-3) having these compositions is preferred when the carbon number of HAO (iii) is 4 to 11.

It is another preferable embodiment (B-4) that the ethylene/α-olefin copolymer (B) comprises (i) ethylene in an amount of 40 to 55% by weight, (ii) an α-olefin of 3 or more carbon atoms in an amount of 40 to 53% by weight, and (iii) HAO in an amount of 7 to 20% by weight. More preferably, it comprises (i) ethylene in an amount of 40 to 50% by weight, (ii) an α-olefin of 3 or more carbon atoms in an amount of 40 to 50% by weight, and (iii) HAO in an amount of 10 to 20% by weight. The ethylene/α-olefin copolymer (B-4) having these compositions is preferred when the carbon number of HAO (iii) is 12 to 20.

Among these embodiments, preferable is the ethylene/α-olefin copolymer (B-1) comprising (i) ethylene in an amount of 60 to 80% by weight, (ii) an α-olefin of 3 or more carbon atoms in an amount of 15 to 39% by weight, and (iii) HAO in an amount of 10 to 20% by weight.

The ethylene/α-olefin copolymer (B) for use in the invention comprising (i) ethylene, (ii) an α-olefin of 3 or more carbon atoms, and (iii) a higher α-olefin of 4 to 20 carbon atoms respectively in an above-noted amount, promises a lubricating oil composition having sufficient low-temperature properties and excellent handling properties at low temperatures.

The copolymer used in the invention allows a wider tolerant range in various properties such as intermolecular composition distribution. This is confirmed, for example, through a work comprising the steps of making graphs showing the relationships between the ethylene content and MR viscosity (MRV) and between the ethylene content and storage stability at low temperatures of the ethylene/α-olefin copolymer (B); studying the available ranges of ethylene content based on the allowable values of the MR viscosity and the storage stability at low temperatures; and comparing the ethylene content ranges to those of bicopolymer of ethylene and an α-olefin of 3 or more carbon atoms.

The composition of the ethylene/α-olefin copolymer (B) is determined by $^{13}$C-NMR in accordance with the method described in "Macromolecule Analysis Handbook" (Society of Japan Analytical Chemistry, edited by Macromolecule Analytical Research Meeting, published by Kinokuniya Shoten).

A molecular weight, more particularly, a weight-average molecular weight (Mw) in terms of polystyrene as measured by a gel permeation chromatography (GPC) of the ethylene/α-olefin copolymer (B), is in the range of 80,000 to 400,000. With the weight-average molecular weight (Mw) being in the above range, the ethylene/α-olefin copolymer (B) is excellent in viscosity index improvement capability (capability of increasing the viscosity), so that a small usage amount of said copolymer (B) suffices to obtain a lubricating oil having a specific viscosity. A lubricating oil composition comprising said copolymer (B) is unlikely to get jelled at a low temperature and is excellent in shear stability of the viscosity of lubricating oil.

When the weight-average molecular weight (Mw) of the ethylene/α-olefin copolymer (B) falls in the range of 250,000 to 400,000, preferably 260,000 to 380,000, more preferably 270,000 to 350,000, the viscosity index of the lubricating oil is particularly improved. When the weight-average molecular weight (Mw) is in the range of 80,000 to below 250,000, preferably 100,000 to 240,000, more preferably 120,000 to 240,000, the shear stability of the viscosity of lubricating oil is exceptionally good.

The measurement by the gel permeation chromatography (GPC) is conducted under the conditions of a temperature of 140° C. and o-dichlorobenzene solvent.

An Mw/Mn ratio (Mw: weight-average molecular weight, Mn: number-average molecular weight) which indicates molecular weight distribution of the ethylene/propylene/α-olefin copolymer, is 2.4 or less, preferably 2.2 or less. When the Mw/Mn ratio is 2.4 or less, the shear stability of the viscosity of lubricating oil is satisfactory and thus preferable.

A melting point (Tm) of the ethylene/α-olefin copolymer (B), as measured by a differential scanning calorimeter (DSC), is preferably 60° C. or below. With such a melting point, the storage stability at low temperatures is satisfactory.

The melting point (Tm) of the ethylene/α-olefin copolymer comprising (i) ethylene in an amount of 60 to 80% by weight, is preferably in the range of 15 to 60° C., more preferably 25 to 50° C., still further more preferably 25 to 45° C.

The melting point (Tm) of the ethylene/α-olefin copolymer comprising (i) ethylene in an amount of 40 to below 60% by weight, is −20° C. or below, preferably −25° C. or below, more preferably −30° C. or below.

The highest temperature on an endothermic curve obtained by the differential scanning calorimeter (DSC) is taken as the melting point. The measurement is made through the steps of putting a sample into an aluminum pan, heating the sample up to a temperature of 200° C. at a rate of 10° C./min, holding the sample at 200° C. for 5 minutes, cooling the sample to a temperature of −150° C. at a rate of 20° C./min, and heating the sample at a rate of 10° C./min to obtain a 2nd run endothermic curve. The melting point is determined from the 2nd run endothermic curve.

In the case where the α-olefin of 3 or more carbon atoms is propylene, the ethylene (i) content (E: % by weight) and the melting point (Tm: ° C.) determined by the DSC preferably satisfy the following relations;

| | | |
|---|---|---|
| AA: when the carbon number of the α-olefin of 4 to 20 carbon atoms (iii) is 12 or more: | 3.31 × E-165 ≧ Tm | (AA-1) |
| preferably | 3.31 × E-170 ≧ Tm | (AA-2) |
| more preferably | 3.31 × E-171 ≧ Tm | (AA-3); |
| BB: when the carbon number of the α-olefin of 4 to 20 carbon atoms (iii) is 6 to 11: | 3.31 × E-179 ≧ Tm | (BB-1) |
| preferably | 3.31 × E-184 ≧ Tm | (BB-2) |
| more preferably and | 3.31 × E-185 ≧ Tm | (BB-3); |
| CC: when the carbon number of the α-olefin of 4 to 20 carbon atoms (iii) is 4 or 5: | 3.31 × E-186 ≧ Tm | (CC-1) |
| preferably | 3.31 × E-192 ≧ Tm | (CC-2) |
| more preferably | 3.31 × E-193 ≧ Tm | (CC-3). |

The above formulas are an indicator of the molecular composition distribution. When the relation between the ethylene (i) content and the melting point satisfy the above formulas (AA to CC), the molecular composition distribution of the ethylene/α-olefin copolymer (B) is presumed to be narrow. Accordingly, it is more unlikely that the cold resistance of lubricating oil are deteriorated, or lubricating oil gets cloudy (HAZE) owing to the presence of high ethylene (i) content portions.

In light of the molecular composition distribution, it is preferable that the ethylene/α-olefin copolymer (B) of the present invention be obtained by copolymerization of (i) ethylene, (ii) an α-olefin of 3 or more carbon atoms, and (iii) a higher α-olefin of 4 to 20 carbon atoms in the presence of a catalyst comprising a metallocene compound and an ionizing ionic compound which are detailed later.

In the viscosity modifier for lubricating oil according to the invention, the ethylene/α-olefin copolymer (B) has an intensity ratio D of Sαβ to Sαα (Sαβ/Sαα) determined by $^{13}$C-NMR spectrum being 0.5 or below.

In lubricating oil comprising the ethylene/α-olefin copolymer (B) with the intensity ratio D (Sαβ/Sαα) being 0.5 or below, improvement may be achieved in flowability at low temperatures and in lubrication properties at high temperatures, and their balance (balance between the low temperature flowability and the high temperature lubrication properties) is especially good.

The Sαβ and the Sαα determined by the $^{13}$C-NMR spectrum are respectively a peak intensity of $CH_2$ in constitutional units derived from ethylene or an α-olefin of 3 or more carbon atoms (including ones derived from (ii) the α-olefin of 3 or more carbon atoms and (iii) the higher α-olefin of 4 to 20 carbon atoms). Specifically, they refer to the two kinds of $CH_2$ positioned as shown below.

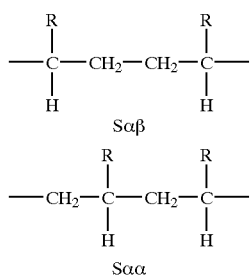

The $^{13}$C-NMR spectrum is analyzed in accordance with the method reported by J. C. Randall (Review Macromolecular Chemistry Physics, C29, 201 (1989)) to measure the Sαβ and the Sββ.

The intensity ratio D is calculated from a ratio of an integral value (area) of each peak. It is generally considered that the thus obtained value of the intensity ratio D is a measure indicating a probability of an occurrence of 1,2 addition reaction of α-olefin followed by 2,1 addition reaction or a probability of an occurrence of 2,1 addition reaction of α-olefin followed by 1,2 addition reaction. Consequently, the larger intensity ratio D indicates the more irregular bonding direction of α-olefin. On the other hand, the smaller intensity ratio D indicates the more regular bonding direction of α-olefin.

The ethylene/α-olefin copolymer (B) exhibits a high effect of improving the viscosity index when blended with a lubricating oil base, and never hinders the function of a pour-point depressant.

The employment of the ethylene/α-olefin copolymer (B) as a viscosity modifier gives lubricating oil satisfying low temperature properties of the GF-3 standards, which are the North American Lubricating Oil Standards of the next generation. Whether or not the lubricating oil satisfies the GF-3 standards is known by measuring the later-described CCS and MRV.

The ethylene/α-olefin copolymer (B) employed as a viscosity modifier for lubricating oil may be obtained by copolymerization of (i) ethylene, (ii) an α-olefin of 3 or more carbon atoms, (iii) a higher α-olefin of 4 to 20 carbon atoms, and an optional monomer in the presence of an olefin polymerization catalyst.

Examples of olefin polymerization catalysts are catalysts comprising a compound of transition metals, such as zirconium, hafnium and titanium, and an organoaluminum compound (organoaluminum oxy-compound) and/or an ionizing ionic compound. Among these, preferable in the present invention are metallocene catalysts comprising a metallocene compound of transition metals selected from Group 4 of the Periodic Table, an organoaluminum oxy-compound and/or an ionizing ionic compound.

Next, descriptions will be made on the metallocene catalyst.

The metallocene compound forming the metallocene catalyst has a transition metal selected from Group 4 of the Periodic Table. Specifically, it is represented by the following formula (a):

MLx             (a).

In the above formula (a), M denotes a transition metal selected from Group 4 of the Periodic Table, specifically zirconium, titanium or hafnium, and x is a valence of the transition metal.

The L's denote ligands coordinated to the transition metal. At least one of the ligands (L's) has a cyclopentadienyl skeleton. Said ligand having a cyclopentadienyl skeleton may be substituted by a substituent.

Examples of the ligand having a cyclopentadienyl skeleton include:

a cyclopentadienyl group;

alkyl- or cycloalkyl-substituted cyclopentadienyl groups, such as methylcyclopentadienyl, ethylcyclopentadienyl, n- or i-propylcyclopentadienyl, n-, i-, sec- or t-butylcyclopentadienyl, hexylcyclopentadienyl, octylcyclopentadienyl, dimethylcyclopentadienyl, trimethylcyclopentadienyl, tetramethylcyclopentadienyl, pentamethylcyclopentadienyl, methylethylcyclopentadienyl, methylpropylcyclopentadienyl, methylbutylcyclopentadienyl, methylhexylcyclopentadienyl, methylbenzylcyclopentadienyl, ethylbutylcyclopentadienyl, ethylhexylcyclopentadienyl and methylcyclohexylcyclopentadienyl groups; and an indenyl group; a 4,5,6,7-tetrahydroindenyl group; and a fluorenyl group.

These groups may be substituted with a halogen atom or a trialkylsilyl group.

Among these, particularly preferable are alkyl-substituted cyclopentadienyl groups.

When a compound represented by the formula (a) contains 2 or more groups having a cyclopentadienyl skeleton as the ligand L, 2 of said groups may be bonded through an alkylene group, such as ethylene and propylene; a substituted alkylene group, such as isopropylidene and diphenylmethylene; a silylene group; or a substituted silylene group, such as dimethylsilylene, diphenylsilylene and methylphenylsilylene groups.

Examples of ligands L other than those having a cyclopentadienyl skeleton are hydrocarbon groups of 1 to 12 carbon atoms; alkoxy groups; aryloxy groups; sulfonic acid-containing groups (—SO$_3$R$^a$ wherein R$^a$denotes an alkyl group, an alkyl group substituted with a halogen atom, an aryl group, or an aryl group substituted with a halogen atom or an alkyl group); a halogen atom and hydrogen.

Examples of the hydrocarbon groups of 1 to 12 carbon atoms include alkyl groups, cycloalkyl groups, aryl groups and aralkyl groups. Specifically, exemplified are:

alkyl groups, such as methyl, ethyl, n-propyl, isopropyl, n-butyl, isobutyl, sec-butyl, t-butyl, pentyl, hexyl, octyl, decyl and dodecyl groups;

cycloalkyl groups, such as cyclopentyl and cyclohexyl groups;

aryl groups, such as phenyl and tolyl groups; and aralkyl groups, such as benzyl and neophyl groups.

Examples of alkoxy group are methoxy, ethoxy, n-propoxy, isopropoxy, n-butoxy, isobutoxy, sec-butoxy, t-butoxy, pentoxy, hexoxy and octoxy groups.

An example of aryloxy group is a phenoxy group.

Examples of the sulfonic acid-containing groups (—SO$_3$R$^a$) are methanesulfonato, p-toluenesulfonato, trifluoromethanesulfonato and p-chlorobenzenesulfonato groups.

Examples of the halogen atom are fluorine, chlorine, bromine and iodine.

The following are exemplary metallocene compounds containing zirconium as M and 2 or more ligands having a cyclopentadienyl skeleton;

bis(methylcyclopentadienyl)zirconiumdichloride,
bis(ethylcyclopentadienyl)zirconiumdichloride,
bis(n-propylcyclopentadienyl)zirconiumdichloride,
bis(indenyl)zirconiumdichloride, and
bis(4,5,6,7-tetrahydroindenyl)zirconiumdichloride.

Also mentioned are compounds wherein the zirconium in the above compounds is substituted with titanium or hafnium.

In the present invention, compounds represented by the formula (b) may be used as the metallocene compound:

L$^1$M$^1$X$_2$ (b)

(wherein M denotes a metal of Group 4 of the Periodic Table or a metal of the lanthanide series, L$^1$ denotes a derivative of a delocalized π bonding group, and gives a restraint geometric shape to an active site of the metal M$^1$, respective X may be the same or different and is hydrogen, a halogen atom, a hydrocarbon group having 20 or less carbon atoms, a silyl group having 20 or less silicon atoms, or a germyl group having 20 or less germanium atoms).

Among the compounds of the formula (b), preferred ones are represented by the following formula (c).

In the formula (c), M$^1$ denotes titanium, zirconium or hafnium, and X is of the same definition as in the formula (b).

The Cp is π bonded to M$^1$, and denotes a substituted cyclopentadienyl group having a substituent Z.

The Z denotes oxygen, sulfur, boron or an element of Group 14 of the Periodic Table (e.g. silicon, germanium and tin), the Y denotes a ligand containing nitrogen, phosphorus, oxygen or sulfur, and Z and Y may form a condensed ring.

Examples of compounds represented by the formula (c) are:

[dimethyl(t-butylamido)(tetramethyl-η$^5$-cyclopentadienyl) silane]titaniumdichloride,

[(t-butylamido)(tetramethyl-η$^5$-cyclopentadienyl)-1,2-ethanediyl]titaniumdichloride,

[dibenzyl(t-butylamido)(tetramethyl-η$^5$-cyclopentadienyl) silane]titaniumdichloride,

[dimethyl(t-butylamido)(tetramethyl-η$^5$-cyclopentadienyl) silane]dibenzyltitanium,

[dimethyl (t-butylamido)(tetramethyl-η$^5$-cyclopentadienyl) silane]dimethyltitanium,

[(t-butylamido)(tetramethyl-η$^5$-cyclopentadienyl)-1,2-ethanediyl]dibenzyltitanium,

[(methylamido)(tetramethyl-η$^5$-cyclopentadienyl)-1,2-ethanediyl]dineopentyltitanium,

[(phenylphosphido)(tetramethyl-η$^5$-cyclopentadienyl) methylene]diphenyltitanium,

[dibenzyl(t-butylamido)(tetramethyl-η$^5$-cyclopentadienyl) silane]dibenzyltitanium,

[dimethyl(benzylamido)(η$^5$-cyclopentadienyl)silane]di (trimethylsilyl)titanium,

[dimethyl(phenylphosphido)(tetramethyl-η$^5$-cyclopentadienyl) silane]dibenzyltitanium,

[(tetramethyl-η$^5$-cyclopentadienyl)-1,2-ethanediyl] dibenzyltitanium,

[2-η$^5$-(tetramethyl-cyclopentadienyl)-1-methyl-ethanolate (2-)]dibenzyltitanium,

[2-η$^5$-(tetramethyl-cyclopentadienyl)-1-methyl-ethanolate (2-)]dimethyltitanium,

[2-((4a,4b,8a,9,9a-η)-9H-fluorene-9-yl)cyclohexanolate (2-)]dimethyltitanium, and

[2-((4a,4b,8a,9,9a-η)-9H-fluorene-9-yl)cyclohexanolate (2-)]dibenzyltitanium.

Also mentioned are compounds wherein the titanium metal in the above compounds is substituted with a zirconium metal or a hafnium metal.

These metallocene compounds may be used singly or in combination of 2 or more.

A preferable metallocene compound of the formula (a) for use in the invention is a zirconocene compound having a zirconium atom at the center and at least 2 ligands with a cyclopentadienyl skeleton. Preferably, the central metallic atom of metallocene compounds of the formula (b) or (c) is titanium. Among the exemplified metallocene compounds, preferable are those of the formula (c) having titanium as the central metallic atom.

The organoaluminum oxy-compound forming the metallocene catalyst may be usual aluminoxane or a benzene-insoluble organoaluminum oxy-compound.

The usual aluminoxane is represented as follows.

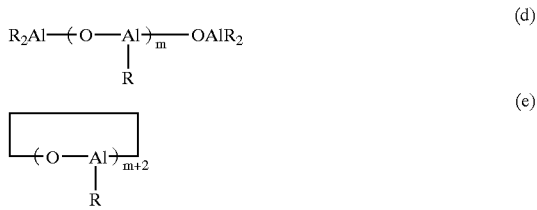

In the formulas (d) and (e), R denotes a hydrocarbon group, such as methyl, ethyl, propyl or butyl group. Preferably, R denotes a methyl group or an ethyl group, highly preferably a methyl group. The letter m in the formulas is an integer of 2 or more, preferably 5 to 40.

The aluminoxane may be composed of mixed alkyloxy-aluminum units consisting of alkyloxyaluminum units of the formula $(OAl(R^1))$ and alkyloxyaluminum units of the formula $(OAl(R^2))$ (wherein $R^1$ and $R^2$ denote the same hydrocarbon groups as for R, and $R^1$ and $R^2$ are different).

Examples of the ionizing ionic compound forming the metallocene catalyst are Lewis acids and ionic compounds.

As the Lewis acids, exemplified are compounds represented by $BR_3$ (wherein R denotes a phenyl group optionally having a substituent such as fluorine, a methyl group and a trifluoromethyl group; or fluorine).

Specific examples of the Lewis acids are:
trifluoroboron,
triphenylboron, tris(4-fluorophenyl)boron, tris(3,5-difluorophenyl)boron, tris(4-fluoromethylphenyl)boron, tris(pentafluorophenyl)boron, tris(p-tolyl)boron, tris(o-tolyl)boron and tris(3,5-dimethylphenyl)boron.

Examples of ionic compounds are:
trialkyl-substituted ammonium salts, N,N-dialkyl ammonium salts, dialkylammonium salts and triarylphosphonium salts.

Specific examples of the trialkyl-substituted ammonium salts are:
triethylammoniumtetra(phenyl)boron, tripropylammoniumtetra(phenyl)boron, tri(n-butyl)ammoniumtetra(phenyl)boron, trimethylammoniumtetra(p-tolyl)boron, trimethylammoniumtetra(o-tolyl)boron, tributylammoniumtetra(pentafluorophenyl)boron, tripropylammoniumtetra(o,p-dimethylphenyl)boron, tributylammoniumtetra(m,m-dimethylphenyl)boron, tributylammoniumtetra(p-trifluoromethylphenyl)boron and tri(n-butyl)ammoniumtetra(o-tolyl)boron.

Specific examples of the N,N-dialkylanilinium salts are:
N,N-dimethylanililnlumtetra(phenyl)boron, N,N-diethylaniliniumtetra(phenyl)boron and N,N-2,4,6-pentamethylaniliniumtetra(phenyl)boron.

Specific examples of the dialkylammonium salts are:
di(1-propyl)ammoniumtetra(pentafluorophenyl)boron and dicyclohexylammoniumtetra(phenyl)boron.

Examples of the ionic compounds also include:
triphenylcarbeniumtetrakis(pentafluorophenyl)borate, N,N-dimethylaniliniumtetrakis(pentafluorophenyl)borate and ferroceniumtetra(pentafluorophenyl)borate. Specific reason for the employment of the ionizing ionic compound resides in its capability of controlling the composition distribution of the ethylene/α-olefin copolymer (B).

An organoaluminum compound may also be used in formation of the metallocene catalyst in addition to the organoaluminum oxy-compound and/or the ionizing ionic compound.

Examples of the organoaluminum compound are those represented by the following formula (f):

$$R^1_n AlX_{3-n} \tag{f}$$

wherein $R^1$ denotes a hydrocarbon group of 1 to 15 carbon atoms, preferably 1 to 4 carbon atoms; X denotes a halogen atom or hydrogen; and n is a number ranging 1 to 3.

Examples of the hydrocarbon group of 1 to 15 carbon atoms are alkyl groups, cycloalkyl groups and aryl groups.

Specifically, exemplified as the hydrocarbon group of 1 to 15 carbon atoms are:
methyl, ethyl, n-propyl, isopropyl, isobutyl, pentyl, hexyl, octyl, cyclopentyl, cyclohexyl, phenyl and tolyl groups.

Specific examples of the organoaluminum compound are:
trialkylaluminums, such as trimethylaluminum, triethylaluminum, triisopropylaluminum, triisobutylaluminum, trioctylaluminum, and tri-2-ethylhexylaluminum;

alkenylaluminums, such as isoprenylaluminum, represented by the formula $$(i\text{-}C_4H_9)_x Al_y (C_5H_{10})_z$$

wherein x, y, z each are a positive number, and $z \geq 2x$;
trialkenylaluminums, such as triisopropenylaluminum;
dialkylaluminumhalides, such as dimethylaluminumchloride, diethylaluminumchloride, diisopropylaluminumchloride, diisobutylaluminumchloride and dimethylaluminumbromide;
alkylaluminumsesquihalides, such as methylaluminumsesquichloride, ethylaluminumsesquichloride, isopropylaluminumsesquichloride, butylaluminumsesquichloride and ethylaluminumsesquibromide;
alkylaluminumdihalides, such as methylaluminumdichloride, ethylaluminumdichloride, isopropylaluminumdichloride and ethylaluminumdibromide;
dialkylaluminumhydrides, such as diethylaluminumhydride and dibutylaluminumhydride; and
alkylaluminumdihydrides, such as ethylaluminumdihydride and propylaluminumdihydride.

In the presence of the above-described metallocene catalyst, (i) ethylene, (ii) an α-olefin of 3 or more carbon atoms, (iii) a higher α-olefin of 4 to 20 carbon atoms, and another optional monomer are copolymerized usually in a liquid phase. In the copolymerization, commonly used as a polymerization solvent is a hydrocarbon solvent, but an α-olefin such as propylene may be used as the solvent.

Examples of the hydrocarbon solvent used in the polymerization are:
aliphatic hydrocarbon atoms, such as pentane, hexane, heptane, octane, decane, dodecane and kerosene, and halogen derivatives thereof;
alicyclic hydrocarbon atoms, such as cyclohexane, methylcyclopentane and methylcyclohexane, and halogen derivatives thereof;
aromatic hydrocarbon atoms, such as benzene, toluene and xylene, and halogen derivatives thereof, such as chlorobenzene.

These solvents are used solely or in combination of 2 or more kinds.

The copolymerization of (i) ethylene, (ii) an α-olefin of 3 or more carbon atoms, (iii) a higher α-olefin of 4 to 20 carbon atoms and optional another monomer may be achieved by either of a batchwise or a continuous process. A continuous process is the more preferable. Particularly, a continuous process using a layer-type agitating reactor is preferred. In the copolymerization by a continuous process, the metallocene catalyst is used in a concentration described below.

The concentration of the metallocene compound in the polymerization system is in the range of 0.00005 to 0.1 mmol/Litter, preferably 0.0001 to 0.05 mmol/Litter (polymerization volume) The organoaluminum oxy-compound is used in an amount making the molar ratio of aluminum atoms to a transition metal of the metallocene compound in the polymerization system (Al/transition metal) to fall in the range of 1 to 10000, preferably 10 to 5000.

The ionizing ionic compound is fed in an amount making its molar ratio to the metallocene compound in the polymerization system (ionizing ionic compound/metallocene compound) to fall in the range of 0.5 to 30, preferably 1 to 25.

The organoaluminum compound, if employed, is fed in a concentration of about 0 to about 5 mmol/Litter, preferably about 0 to about 2 mmol/Litter (polymerization volume).

The copolymerization of (i) ethylene, (ii) an α-olefin of 3 or more carbon atoms, (iii) a higher α-olefin of 4 to 20 carbon atoms and optional another monomer is carried out, in the presence of the metallocene catalyst, under the conditions of a temperature of −20 to 150° C., preferably 0 to 120° C., more preferably 0 to 100° C., and a pressure of above 0 to 80 kg/cm$^2$, preferably above 0 to 50 kg/cm$^2$. Preferably, the conditions are kept steady in the case of a continuous process.

The reaction time (average retention time in the case of a continuous process) of the copolymerization varies depending on, for example, the catalyst concentration and the polymerization temperature. Usually, it is in the range of 5 minutes to 5 hours, preferably 10 minutes to 3 hours.

Ethylene (i), an α-olefin of 3 or more carbon atoms (ii), a higher α-olefin of 4 to 20 carbon atoms (iii) and optional another monomer are fed into the polymerization system respectively in an appropriate amount to obtain the ethylene/α-olefin copolymer of specific composition. A molecular weight modifier such as hydrogen may be employed in the copolymerization.

Conducted under the above-noted conditions, the copolymerization of (i) ethylene, (ii) an α-olefin of 3 or more carbon atoms, (iii) a higher α-olefin of 4 to 20 carbon atoms and optional another monomer, gives a polymerization liquid containing the ethylene/α-olefin copolymer (B). The polymerization liquid is treated by a conventional method to obtain the ethylene/α-olefin copolymer (B) of the invention.

Lubricating Oil Composition

The lubricating oil composition of the present invention comprises a lubricating oil base (A) and the ethylene/α-olefin copolymer (B), or in additionally comprises a pour-point depressant (C).

First, descriptions will be focused on components forming the lubricating oil compositions of the invention.

(A) Lubricating Oil Base

Exemplary lubricating oil bases for use in the invention include mineral oils; and synthetic oils, such as poly α-olefins, polyol ester, diesters (e.g. dioctyl phthalate, dioctyl sebacate) and polyalkylene glycol. Preferred are mineral oils and a blend of mineral oil and synthetic oil. The mineral oils go through a purification process, such as dewaxing, before use and are classified into several ranks according to the purification. Generally used are mineral oils containing wax component in an amount of 0.5 to 10%. Highly refined oils with a low pour point and a high viscosity index, which are produced by a hydrocracking purification method and which contains isoparaffin as a main component, are also employable. Also useable are mineral oils having a kinematic viscosity at 40° C. of 10 to 200 cSt.

(B) Ethylene/α-Olefin Copolymer

The ethylene/α-olefin copolymer (B) has already been described in the section of the viscosity modifier for lubricating oil.

Repetitiously, the ethylene/α-olefin copolymer (B) comprises:

(i) ethylene, (ii) an α-olefin of 3 or more carbon atoms, and (iii) a higher α-olefin of 4 to 20 carbon atoms in which the carbon number always exceeds that of said α-olefin of 3 or more carbon atoms by a majority of 1 or more;

and said copolymer (B) has the following properties (1) and (2):

(1) a content of ethylene (i) is in the range of 40 to 80% by weight, a content of the α-olefin of 3 or more carbon atoms (ii) is in the range of 15 to 59% by weight, and a content of the higher α-olefin of 4 to 20 carbon atoms (iii) is in the range of 0.1 to 25% by weight with the proviso that the sum is 100% by weight; and (2) a weight-average molecular weight (Mw) in terms of polystyrene as measured by GPC is between 80,000 and 400,000.

The ethylene/α-olefin copolymer (B) preferably has a ratio of Mw/Mn being 2.4 or less (3).

The ethylene/α-olefin copolymer (B) preferably has a melting point (Tm) being 60° C. or lower as measured by DSC (4).

It is preferable that the α-olefin of 3 or more carbon atoms (ii) which is a constituent of the ethylene/α-olefin copolymer (B), be propylene. Preferably, the higher α-olefin (iii) which is another constituent of the ethylene/α-olefin copolymer (B), has 6 to 20 carbon atoms.

It is preferable in the ethylene/α-olefin copolymer (B) that the content of ethylene (i) be in the range of 60 to 80% by weight, the content of the α-olefin of 3 or more carbon atoms (ii) be in the range of 18 to 34% by weight, and the content of the higher α-olefin of 4 to 20 carbon atoms (iii) be in the range of 0.5 to 20% by weight.

In the case where the α-olefin of 3 or more carbon atoms (ii) is propylene, the ethylene (i) content (E: % by weight) and the melting point (Tm: ° C.) determined by the DSC preferably satisfy the following relations:

| | | |
|---|---|---|
| AA: when the carbon number of the α-olefin of 4 to 20 carbon atoms (iii) is 12 or more: | $3.31 \times E{-}165 \geq Tm$ | (AA-1) |
| preferably | $3.31 \times E{-}170 \geq Tm$ | (AA-2) |
| more preferably | $3.31 \times E{-}171 \geq Tm$ | (AA-3); |

| | | |
|---|---|---|
| BB: when the carbon number of the α-olefin of 4 to 20 carbon atoms (iii) is 6 to 11: | $3.31 \times E{-}179 \geq Tm$ | (BB-1) |
| preferably | $3.31 \times E{-}184 \geq Tm$ | (BB-2) |
| more preferably and | $3.31 \times E{-}185 \geq Tm$ | (BB-3); |

| CC: when the carbon number of the α-olefin of 4 to 20 carbon atoms (iii) is 4 or 5: | $3.31 \times E-186 \geq Tm$ | (CC-1) |
|---|---|---|
| preferably | $3.31 \times E-192 \geq Tm$ | (CC-2) |
| more preferably | $3.31 \times E-193 \geq Tm$ | (CC-3). |

Preferably, the ethylene/α-olefin copolymer (B) has an intensity ratio D of Sαβ to Sαα (Sαβ/Sαα) determined by $^{13}$C-NMR spectrum being 0.5 or below.

(C) Pour-Point Depressant

Examples of the pour point depressant (C) for use in the invention include alkylated naphthalene, (co) polymers of alkyl methacrylates, (co)polymers of alkyl acrylates, copolymers of alkyl fumarates and vinyl acetate, α-olefin polymers, and copolymers of α-olefins and styrene. Among these, (co)polymers of alkyl methacrylates and (co)polymers of alkyl acrylates are preferably employed.

Lubricating Oil Composition

The lubricating oil composition of the first embodiment of the invention comprises the lubricating oil base (A) and the ethylene/α-olefin copolymer (B) in an amount of 1 to 30% by weight, preferably 1 to 20% by weight, more preferably 5 to 10% by weight (residues are the lubricating oil base (A) and ingredients mentioned later).

Said lubricating oil composition has small dependency on temperature and is excellent in low-temperature properties. Occasionally, the lubricating oil composition is employed as it is for applications as a lubricating oil. Otherwise, it is further blended with a lubricating oil base and a pour-point depressant before the lubricating oil applications.

The lubricating oil composition of the second embodiment comprises the lubricating oil base (A), the ethylene/α-olefin copolymer (B) and the pour-point depressant (C). The content of the ethylene/α-olefin copolymer (B) is in the range of 0.1 to 5% by weight, preferably 0.2 to 1.5% by weight, more preferably 0.25 to 1.5% by weight, highly preferably 0.30 to 1.5% by weight. The content of the pour-point depressant (C) is in the range of 0.05 to 5% by weight, preferably 0.1 to 3% by weight, more preferably 0.1 to 2% by weight, highly preferably 0.2 to 1.5 by weight. Residues are the lubricating oil base (A) and ingredients mentioned later. With respect to the lubricating oil composition of the second embodiment, improvement may be achieved in viscosity when the content of the ethylene/α-olefin copolymer (B) is 0.1% by weight or more. The copolymer (B) could contain, because of its composition distribution, components which hinder the effect of the pour-point depressant (C). However, that hindrance can be avoided by rendering the copolymer (B) content 5% by weight or less. Accordingly, with the ethylene/α-olefin copolymer (B) content being in the above ranges, a lubricating oil composition is excellent in viscosity improvement effect and in flowability at a low temperature.

Said lubricating oil composition has small dependency on temperature in viscosity and is excellent in low-temperature properties at any shear rates. It also has attractive fuel efficiency. The rise of its pour point owing to the interaction between the ethylene/α-olefin copolymer and the pour-point depressant, is small. The lubricating oil composition is excellent in high-temperature properties and shows satisfactory lubrication properties.

The lubricating oil compositions of the invention may contain ingredients, such as (co)polymers of alkyl methacrylates, ingredients having viscosity-index improvement effect (e.g. hydrogenated SBR, hydrogenated SEBS), cleaning agent, rust inhibitor, dispersing agent, extreme-pressure agent, antiforming agent, antioxidant, and metal deactivator in addition to the lubricating oil base (A), the ethylene/α-olefin copolymer (B) and the pour-point depressant (C).

The lubricating oil composition of the invention may be produced by mixing or dissolving the ethylene/α-olefin copolymer (B) and optional ingredients with (in) the lubricating oil base (A) through a conventional method. Otherwise, it may be produced by mixing or dissolving the ethylene/α-olefin copolymer (B), the pour-point depressant (C) and optional ingredients with (in) the lubricating oil base (A) through a conventional method.

Effect of the Invention

The employment of the viscosity modifier for lubricating oil according to the present invention makes it possible to obtain a lubricating oil composition excellent in low-temperature properties, oxidation stability, lubricity at high temperatures and fuel efficiency.

Said lubricating oil composition itself does not get jelled at a low temperature, which adds excellent handling properties to its characteristics.

EXAMPLE

This invention will be described in detail with the reference to the following examples. These are not, however, to limit the scope of the invention in any way.

In the examples, physical properties were measured as follows.

Ethylene/α-Olefin Copolymer Composition

The measurement was performed by the use of LA 500 Model nuclear magnetism resonance device (JEOL Ltd.) in a mixed solvent of orthodichlorobenzene and benzene-d6 (volume ratio: orthodichlorobenzene/benzene-d6=3/1 to 4/1) under the conditions of a temperature of 120° C., a pulse width of 45° pulse, and a pulse repetition time of 5.5 seconds.

Viscosity at 100° C. (K.V.)

The K.V. was determined according to ASTM D-445. The K.V. was adjusted to be about 10 mm$^2$/sec in the examples.

Cold Cranking Simulator (CCS)

The CCS was determined according to ASTM D-2602. The CCS is used in evaluating the sliding properties (starting properties) at a low temperature at a crank shaft. The smaller value shows the better low-temperature properties of the lubricating oil.

Mini-Rotary Viscometer (MRV)

The MRV was determined according to ASTM D-3829 and D-4684. The MRV is used in evaluating pumping properties of an oil pump at a low temperature. The smaller value shows the better low-temperature properties of the lubricating oil.

Shear Stability Index (SSI)

The SSI was determined according to ASTM D-3945. The SSI is a scale of loss of the kinematic viscosity owing to breakage of molecular chains which is caused when the copolymer components in the lubricating oil suffer shearing force in sliding. The larger SSI value shows the greater loss of the kinematic viscosity.

High Temperature High Shear Viscosity (HTHS)

The HTHS was measured at 150° C. under $10^6 s^{-1}$ according to ASTM D-4624. The HTHS is used in evaluation of the lubricating oil properties at a high temperature under a high shear rate. The larger HTHS value shows the better lubricating oil properties at a high temperature.

Flowability at a Low Temperature

After the lubricating oil was kept at a temperature of −18° C. for 2 weeks, its flowability (appearance) was observed and evaluated as follows.

1: The lubricating oil flows and is free from jellylike components.
2: The lubricating oil flows but is partially in jelled state.
3: The lubricating oil is wholly in jelled state.

In view of clogging, absence of jelled components is highly preferable when the lubricating oil is used at a low temperature.

Polymerization Example 1
[Synthesis of an Olefin Copolymer]

Into a 2-liter autoclave with an agitating impeller (by SUS) which had been sufficiently purged with nitrogen, heptane 900 ml was charged at a temperature of 23° C. While rotating the agitating impeller and ice-cooling the autoclave, propylene 4.5 Nl and hydrogen 90 ml were introduced into the autoclave. The autoclave was then heated to a temperature of 70° C., and was pressurized with ethylene to make a total pressure 6 KG. When the inside pressure of the autoclave became 6 KG, a hexane solution 1.0 ml containing triisobutylaluminum (TIBA) 1.0 mmol/ml, was pressed into the autoclave with nitrogen. Next, a toluene solution 3 ml which had been previously prepared, containing triphenylcarbenium(tetrakispentafluorophenyl) borate 0.016 mmol in terms of B and [dimethyl(t-butylamido)(tetramethyl-$\eta^5$-cyclopentadienyl) silane] titaniumdichloride 0.0004 mmol, was pressed into the autoclave with nitrogen to Initiate the polymerization. For the next five minutes, the inside temperature of the autoclave was kept steady at 70° C. and ethylene was continuously supplied directly into the autoclave to keep the pressure at 6 KG. After 5 minutes from the initiation, the polymerization was stopped by pouring methanol 5 ml into the autoclave with a pump. The pressure in the autoclave was released to atmospheric pressure. Methanol 3 Liter was poured into the reaction solution with stirring. The resultant polymer containing solvent was dried under the conditions of a temperature of 130° C. and an atmospheric pressure of 600 Torr for 13 hours to obtain an ethylene/propylene copolymer 32 g. The properties of the polymer are shown in Table 1.

Polymerization Example 2

A polymer 26 g was obtained in the same manner as in Polymerization Example 1 except that the propylene was used in an amount of 3.5 Nl, and 1-butene 5 g was newly added. The properties of the polymer are shown in Table 1.

Polymerization Example 3

A polymer 38 g was obtained in the same manner as in Polymerization Example 1 except that the propylene was used in an amount of 4.0 Nl, and 1-octene 5 g was newly added The properties of the polymer are shown in Table 1.

Polymerization Example 4

A polymer 22 g was obtained in the same manner as in Polymerization Example 1 except that the propylene was used in an amount of 3.5 Nl, and 1-octene 10 g was newly added. The properties of the polymer are shown in Table 1.

Polymerization Example 5

A polymer 21 g was obtained in the same manner as in Polymerization Example 1 except that the propylene was used in an amount of 3.5 Nl, and octadecene 12 g was newly added. The properties of the polymer are shown in Table 1.

TABLE 1

Properties of the Ethylene/Propylene Copolymers

| Polymer Properties | P-Ex.1 | P-Ex.2 | P-Ex.3 | P-Ex.4 | P-Ex.5 |
|---|---|---|---|---|---|
| Ethylene Content (wt %) | 73.0 | 73.5 | 72.3 | 70.7 | 66.3 |
| Propylene Content (wt %) | 27.0 | 21.2 | 24.6 | 20.0 | 21.2 |
| Butene Content (wt %) | — | 5.3 | — | — | — |
| Octent Content (wt %) | — | — | 3.1 | 8.3 | — |
| Octadecene Content (wt %) | — | — | — | — | 12.5 |
| Mw × 10000 (in terms of PS) | 31.8 | 30.9 | 30.2 | 29.6 | 29.3 |
| Mw/Mn | 1.9 | 2.0 | 1.9 | 2.0 | 2.0 |
| Tm (° C.) | 46.9 | 47.8 | 46.0 | 47.1 | 47.5 |
| Sαβ/Sαα (%) | 0.15 | 0.15 | 0.15 | 0.15 | 0.15 |

Copolymers in the examples were treated to have nearly the same melting point.

Examples 1 to 4

In each of the examples, lubricating oil was produced from a mixed oil 89.04% by weight, which was composed of Mineral Oil 100 Neutral and Mineral Oil 150 Neutral (by ESSO) (Mineral Oil 100 Neutral/Mineral Oil 150 Neutral= 80/20), as a lubricating oil base, the polymer 0.46% by weight obtained in Polymerization Examples 2 to 5 respectively as a viscosity index improver (viscosity modifier), Aclube 133 (by Sanyo Kasei) 0.5% by weight as a pour-point depressant, and a cleaning dispersant (by The Lubrizol Corporation) 10 parts by weight. The properties and the flowability at a low temperature of the lubricating oil obtained in the examples were evaluated. The results are shown in Table 2.

Comparative Example 1

Lubricating oil was prepared in the same manner as in Example 1 except that the mixed oil of Mineral Oil 100 Neutral and Mineral Oil 150 Neutral (by ESSO) (Mineral Oil 100 Neutral/Mineral Oil 150 Neutral=80/20) as a lubricating oil base and the polymer obtained in Polymerization Example 1 as a viscosity index improver, were used respectively in an amount given in Table 2. The properties and the flowability at a low temperature of the lubricating oil were evaluated. The results are shown in Table 2.

TABLE 2

Composition and Properties of Lubricating Oils

| Used Polymer Type | C-Ex.1 P-Ex.1 | Ex.1 P-Ex.2 | Ex.2 P-Ex.3 | Ex.3 P-Ex.4 | Ex.4 P-Ex.5 |
|---|---|---|---|---|---|
| Amount (wt %) | | | | | |
| Lubricating oil Base | 89.04 | 89.04 | 89.04 | 89.04 | 89.04 |
| Detergent-Dispersant | 10.0 | 10.0 | 10.0 | 10.0 | 10.0 |
| Pour-Point Depressant | 0.5 | 0.5 | 0.5 | 0.5 | 0.5 |
| Copolymer | 0.46 | 0.46 | 0.46 | 0.46 | 0.46 |

TABLE 2-continued

Composition and Properties of Lubricating Oils

| Used Polymer Type | C-Ex.1 P-Ex.1 | Ex.1 P-Ex.2 | Ex.2 P-Ex.3 | Ex.3 P-Ex.4 | Ex.4 P-Ex.5 |
|---|---|---|---|---|---|
| Lubricating Oil Properties | | | | | |
| K.V. at 100° C. (mm²/s) | 10.16 | 10.14 | 10.13 | 10.11 | 10.11 |
| SSI | 48.0 | 47.0 | 47.0 | 46.0 | 46.0 |
| CCS | 2780 | 2770 | 2790 | 2760 | 2750 |
| MRV | 23200 | 23100 | 23200 | 22900 | 22800 |
| Low Temperature Flowability | 2 | 1 | 1 | 1 | 1 |

Table 2 shows that the lubricating oil compositions comprising a specific copolymer of ethylene, propylene and a higher α-olefin of 4 to 20 carbon atoms as a viscosity modifier, do not get jelled at a low temperature and are free from clogging and excellent in refueling properties in comparison with a lubricating oil composition comprising an ethylene/propylene copolymer as a viscosity modifier.

Desirably, lubricating oil compositions are improved to the greatest extent possible in low-temperature properties such as CCS viscosity and MRV viscosity. The improvement may be achieved with respect to the CCS viscosity by about 10 in measurement value, and with respect to the MRV viscosity by about 100 in measurement value by raising the purity of the base oil for lubricating oil, which costs a great deal though.

Taking the above description into consideration, the present invention is of great significance in the respect that the CCS viscosity and the MRV viscosity may be improved without costly processes.

What is claimed is:

1. A viscosity modifier for lubricating oil comprising an ethylene/α-olefin copolymer (B) composed of:
   (i) ethylene,
   (ii) an α-olefin of 3 or more carbon atoms, and
   (iii) a higher α-olefin of 4 to 20 carbon atoms wherein the carbon number of (iii) is larger than that of (ii) by one or more, and
   the ethylene/α-olefin copolymer (B) has the following properties (b-1) and (b-2):
   (b-1) a content of ethylene (i) is in the range of 60 to 80% by weight, a content of the α-olefin of 3 or more carbon atoms (ii) is in the range of 15 to 39% by weight, and a content of the higher α-olefin of 4 to 20 carbon atoms (iii) is in the range of 0.1 to 20% by weight with the proviso that the sum is 100% by weight; and
   (b-2) a weight-average molecular weight (Mw) in terms of polystyrene as measured by GPC is between 80,000 and 400,000; and
   (b-3) the ethylene/α-olefin copolymer (B) has an intensity ratio D of Sαβ to Sαα (Sαβ/Sαα) determined by a $^{13}$C-NMR spectrum of 0.5 or below.

2. The viscosity modifier for lubricating oil as claimed in claim 1, wherein the ethylene/α-olefin copolymer (B) has the property (b-3):
   (b-3) a ratio of Mw/Mn (Mn: number-average molecular weight) is 2.4 or less.

3. The viscosity modifier for lubricating oil as claimed in claim 1 or 2, wherein the ethylene/α-olefin copolymer (B) has the property (b-4):
   (b-4) a melting point (Tm) as measured by DSC is 60° C. or lower.

4. The viscosity modifier for lubricating oil as claimed in claim 1, wherein the α-olefin of 3 or more carbon atoms (ii) is propylene.

5. The viscosity modifier for lubricating oil as claimed in claim 1, wherein the carbon number of the higher α-olefin (iii) is in the range of 6 to 20.

6. The viscosity modifier for lubricating oil as claimed in claim 1, wherein the ethylene/α-olefin copolymer (B) contains (i) ethylene in an amount of 60 to 80% by weight, (ii) an α-olefin of 3 or more carbon atoms in an amount of 18 to 34% by weight, and (iii) a higher α-olefin of 4 of 20 carbon atoms in an amount of 0.5 to 20% by weight.

7. A lubricating oil composition comprising:
   (A) a lubricating oil base, and
   (B) an ethylene/α-olefin copolymer in an amount of 1 to 30% by weight, which copolymer is comprising:
   (i) ethylene,
   (ii) an α-olefin of 3 or more carbon atoms, and
   (iii) a higher α-olefin of 4 to 20 carbon atoms wherein the carbon number of (iii) is larger than that of (ii) by one or more, and
   the ethylene/α-olefin copolymer (B) has the following properties (b-1) and (b-2):
   (b-1) a content of ethylene (i) is in the range of 60 to 80% by weight, a content of the α-olefin of 3 or more carbon atoms (ii) is in the range of 15 to 39% by weight, and a content of the higher α-olefin of 4 to 20 carbon atoms (iii) is in the range of 0.1 to 20% by weight with the proviso that the sum is 100% by weight; and
   (b-2) a weight-average molecular weight (Mw) in terms of polystyrene as measured by GPC is between 80,000 and 400,000; and
   (b-3) the ethylene/α-olefin copolymer (B) has an intensity ratio D of Sαβ to Sαα (Sαβ/Sαα) determined by a $^{13}$C-NMR spectrum of 0.5 or below.

8. A lubricating oil composition comprising:
   (A) a lubricating oil base,
   (B) an ethylene/α-olefin copolymer in an amount of 0.1 to 5% by weight, which copolymer is comprising:
   (i) ethylene,
   (ii) an α-olefin of 3 or more carbon atoms, and
   (iii) a higher α-olefin of 4 to 20 carbon atoms wherein the carbon number of (iii) is larger than that of (ii) by one or more, and
   (C) a pour-point depressant in an amount of 0.05 to 5% by weight;
   wherein the ethylene/α-olefin copolymer (B) has the following properties (b-1) and (b-2):
   (b-1) a content of ethylene (i) is in the range of 60 to 80% by weight, a content of the α-olefin of 3 or more carbon atoms (ii) is in the range of 15 to 39% by weight, and a content of the higher α-olefin of 4 to 20 carbon atoms (iii) is in the range of 0.1 to 20% by weight with the proviso that the sum is 100% by weight; and
   (b-2) a weight-average molecular weight (Mw) in terms of polystyrene as measured by GPC is between 80,000 and 400,000; and (b-3) the ethylene/α-olefin copolymer (B) has an intensity ratio D of Sαβ to Sαα (Sαβ/Sαα) determined by a $^{13}$C-NMR spectrum of 0.5 or below.

9. The lubricating oil composition as claimed in claim 7 or 8, wherein the ethylene/α-olefin copolymer (B) has the property (b-3):

(b-3) a ratio of Mw/Mn (Mn: number-average molecular weight) is 2.4 or less.

10. The lubricating oil composition as claimed in claim 7, wherein the ethylene/α-olefin copolymer (B) has the property (b-4):

(b-4) a melting point (Tm) as measured by DSC is 60° C. or lower.

11. The lubricating oil composition as claimed in claim 7, wherein the α-olefin of 3 or more carbon atoms (ii) is propylene.

12. The lubricating oil composition as claimed in claim 7, wherein the higher α-olefin (iii) has 6 to 20 carbon atoms.

13. The lubricating oil composition as claimed in claim 7, wherein the ethylene/α-olefin copolymer (B) contains (i) ethylene in an amount of 60 to 80% by weight, (ii) an α-olefin of 3 or more carbon atoms in an amount of 18 to 34% by weight, and (iii) a higher α-olefin of 4 to 20 carbon atoms in an amount of 0.5 to 20% by weight.

* * * * *